(12) United States Patent
Yang et al.

(10) Patent No.: US 11,843,321 B2
(45) Date of Patent: Dec. 12, 2023

(54) CONTROL CIRCUIT HAVING POWER SAVING MODE FOR USE IN POWER SUPPLY CIRCUIT

(71) Applicant: RICHTEK TECHNOLOGY CORPORATION, Zhubei (TW)

(72) Inventors: Ta-Yung Yang, Taoyuan (TW); Wei-Hsu Chang, Hsinchu (TW); Yu-Chang Chen, Nantou (TW); Tsung-Wei Huang, Taipei (TW); Shui-Mu Lin, Taichung (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 253 days.

(21) Appl. No.: 17/534,538

(22) Filed: Nov. 24, 2021

(65) Prior Publication Data

US 2022/0181987 A1 Jun. 9, 2022

Related U.S. Application Data

(60) Provisional application No. 63/188,138, filed on May 13, 2021, provisional application No. 63/121,857, filed on Dec. 4, 2020.

(30) Foreign Application Priority Data

May 13, 2021 (TW) .................................. 110117300
Oct. 20, 2021 (TW) .................................. 110138963

(51) Int. Cl.
*H02M 3/335* (2006.01)
*H02M 1/08* (2006.01)

(52) U.S. Cl.
CPC ......... *H02M 3/33592* (2013.01); *H02M 1/08* (2013.01)

(58) Field of Classification Search
CPC ............... H02M 3/33592; H02M 1/08; H02M 3/33576; H02M 3/07
See application file for complete search history.

(56) References Cited

U.S. PATENT DOCUMENTS

2013/0271056 A1* 10/2013 Bunte .................... F03D 7/0224
318/503
2023/0275464 A1* 8/2023 Ganesh .................... H02J 50/12
307/104

* cited by examiner

*Primary Examiner* — Kyle J Moody
(74) *Attorney, Agent, or Firm* — Tung & Associates

(57) ABSTRACT

A control circuit for controlling a power supply circuit to provide power to a system device which includes a communication circuit includes: a pulse width modulation (PWM) controller configured to switch a transformer of the power supply circuit to generate a first output voltage; and a switched capacitor converter configured to generate a second output voltage according to the first output voltage. The second output voltage provides power to the communication circuit, wherein the communication circuit generates a power saving signal to control the PWM controller and the switched capacitor converter. When the power saving signal is enabled, the first output voltage is decreased and a duty ratio of the switched capacitor converter is increased.

21 Claims, 10 Drawing Sheets

CONTROL CIRCUIT HAVING POWER SAVING MODE FOR USE IN POWER SUPPLY CIRCUIT

CROSS REFERENCE

The present invention claims priority to U.S. 63/121,857 filed on Dec. 4, 2020, claims priority to U.S. 63/188,138 filed on May 13, 2021, claims priority to TW 110117300 filed on May 13, 2021, and claims priority to TW 110138963 filed on Oct. 20, 2021.

BACKGROUND OF THE INVENTION

Field of Invention

The present invention relates to a control circuit for use in a power supply circuit, and particularly to a control circuit having a power saving mode, for controlling a power supply circuit which provides power to a system device having a communication circuit.

Description of Related Art

FIG. 1 illustrates a conventional power supply circuit. The power supply circuit 1000 is employed to generate an output voltage Vo for providing power to a system device. During an operation mode, when a main device in the system device operates, the output voltage Vo is high, but in a power saving mode, only for example a communication circuit in the system device is required to operate, so the output voltage Vo can be reduced. However, because the output voltage Vo can vary in a very wide range (for instance 3V~48V), it is very difficult to design the low dropout regulator 40 which provides power to the communication circuit, and the power conversion efficiency is poor.

In view of the above, to overcome the drawbacks in the prior art, the present invention proposes a novel power supply circuit, a control circuit thereof and a hybrid power converter circuit, with reduced cost and reduced circuit size.

SUMMARY OF THE INVENTION

In one aspect, the present invention provides a control circuit for controlling a power supply circuit to provide power to a system device which includes a communication circuit, the control circuit comprising: a pulse width modulation (PWM) controller configured to operably switch a transformer of the power supply circuit to generate a first output voltage; and a switched capacitor converter configured to operably generate a second output voltage according to the first output voltage; wherein the second output voltage is configured to operably provide power to the communication circuit, wherein the communication circuit generates a power saving signal to control the PWM controller and the switched capacitor converter, wherein when the power saving signal is enabled, the first output voltage is reduced and a duty ratio of the switched capacitor converter is increased.

In one embodiment, the control circuit further includes an output voltage controller configured to operably generate a first control signal and a second control signal, wherein the first control signal is configured to operably regulate the first output voltage and the second control signal is configured to operably control the second output voltage.

In one embodiment, the switched capacitor converter is a buck converter having a duty ratio which is less than 50%.

In one embodiment, when the power saving signal is enabled, a switching frequency of the switched capacitor converter is reduced.

In one embodiment, a level of the first output voltage is higher than a level of the second output voltage.

In one embodiment, when the power saving signal is enabled, a level of the first output voltage is twice a level of the second output voltage.

In one embodiment, when an output load of the power supply circuit is decreased, a switching frequency of the PWM controller is decreased.

In one embodiment, the switched capacitor converter operates in a discontinuous conduction mode.

In one embodiment, the control circuit further includes a synchronous rectifier configured to operably generate the first output voltage.

In one embodiment, when the power saving signal is enabled, the duty ratio of the switched capacitor converter is close to 50%.

In one embodiment, the control circuit further includes a low dropout regulator configured to operably generate a regulated power source according to the second output voltage, to provide power to the communication circuit.

In one embodiment, the output voltage controller includes a first error amplifier and a second error amplifier, wherein the first error amplifier is coupled to the first output voltage to generate the first control signal, and wherein the second error amplifier is coupled to the second output voltage to generate the second control signal.

In one embodiment, when the power saving signal is enabled, the second error amplifier is open-loop.

In one embodiment, the first control signal is coupled to the PWM controller via an optocoupler.

In one embodiment, the switched capacitor converter includes: an inductor, a plurality of capacitors and a plurality of switches coupled with one another; wherein when the power saving signal is disabled, the plurality of switches are configured to operably switch the inductor and the plurality of capacitors, such that the switched capacitor converter operates in a buck switching mode; wherein when the power saving signal is enabled, the plurality of switches are configured to operably switch the inductor and the plurality of capacitors, such that the switched capacitor converter operates in a capacitive power conversion mode.

In one embodiment, the plurality of capacitors include a first capacitor and a second capacitor; the plurality of switches include a first high side switch, a second high side switch, a first low side switch and a second low side switch, wherein the first high side switch and the second high side switch are connected in series between the first output voltage and a switching node, and the first high side switch and the second high side switch are coupled with each other at a high side middle node; wherein the first low side switch and the second low side switch are connected in series between the ground level and the switching node, and the first low side switch and the second low side switch are coupled with each other at a low side middle node; wherein the inductor is coupled between the switching node and the second output voltage; wherein the first capacitor is coupled between the high side middle node and the low side middle node; wherein the second capacitor is coupled to the second output voltage.

In one embodiment, the first high side switch and the second low side switch are switched according to a first switching signal based on a switching cycle and a duty ratio, wherein the second high side switch and the first low side switch are switched according to a second switching signal based on the switching cycle and the duty ratio; wherein when the power saving signal is disabled, the duty ratio is less than 50%; wherein when the power saving signal is enabled, the duty ratio substantially equals to 50%.

In one embodiment, the plural switches further include a bypass switch connected in parallel with the inductor, wherein when the power saving signal is disabled, the bypass switch is turned off, and wherein when the power saving signal is enabled, the bypass switch is turned on.

In one embodiment, the plurality of switches further include a high side auxiliary switch and a low side auxiliary switch, wherein the high side auxiliary switch is coupled between the second output voltage and the high side middle node, wherein the low side auxiliary switch is coupled between the second output voltage and the low side middle node; wherein when the power saving signal is disabled, the high side auxiliary switch and the low side auxiliary switch are turned off; wherein when the power saving signal is enabled, the second high side switch and the second low side switch are turned off.

In one embodiment, when the power saving signal is disabled, the first high side switch and the second low side switch are switched according to a first switching signal based on a switching cycle and a duty ratio, the second high side switch and the first low side switch are switched according to a second switching signal based on the switching cycle and the duty ratio, wherein the duty ratio is less than 50%; when the power saving signal is enabled, the first high side switch and the low side auxiliary switch are switched according to the first switching signal based on the switching cycle and the duty ratio, and the high side auxiliary switch and the first low side switch are switched according to the second switching signal based on the switching cycle and the duty ratio, wherein the duty ratio substantially equals to 50%.

In one embodiment, when the power saving signal is disabled, the inductor and the plurality of capacitors are switched by the first high side switch, the second high side switch, the first low side switch and the second low side switch based on a switching cycle to perform three-level PWM power conversion; wherein when the power saving signal is enabled, the inductor and the plurality of capacitors are switched by the first high side switch, the high side auxiliary switch, the first low side switch and the low side auxiliary switch based on the switching cycle to perform capacitive power conversion.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
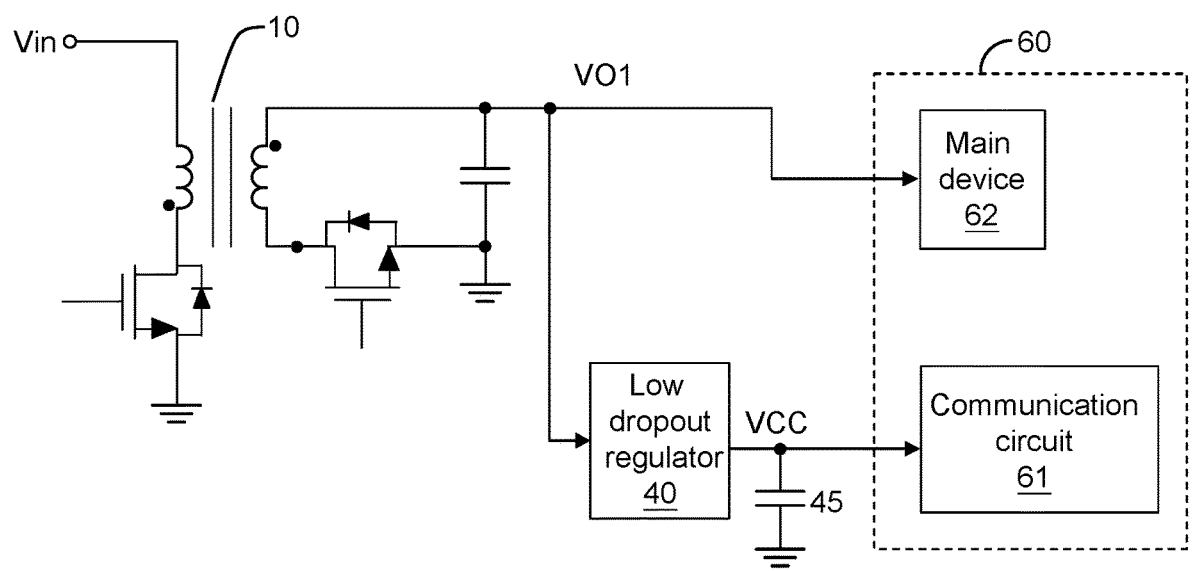
FIG. 1 illustrates a conventional power supply circuit.
Figure 2:
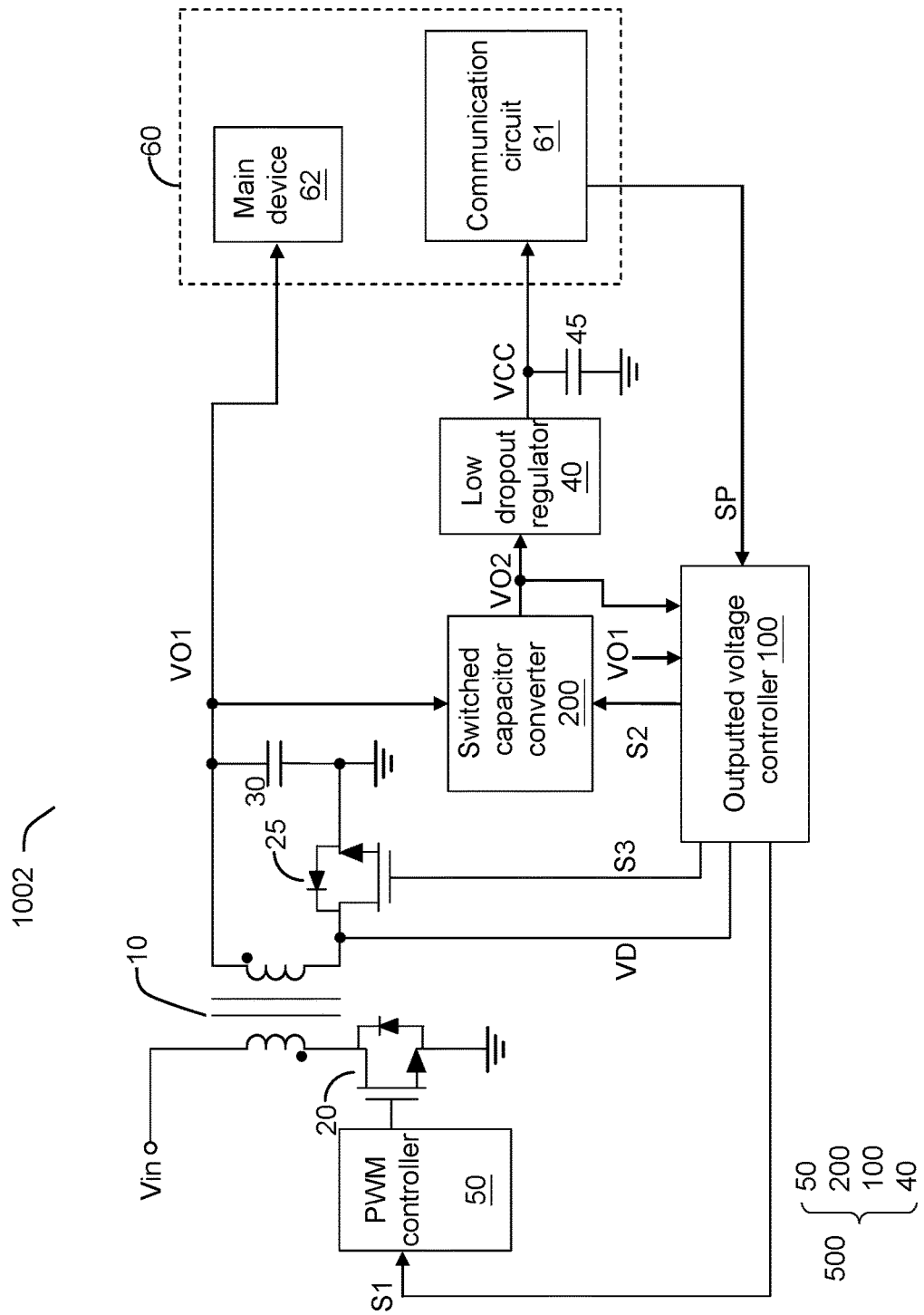
FIG. 2 illustrates a schematic circuit diagram of a control circuit for controlling a power supply circuit in accordance with one embodiment of the present invention.

FIG. 2 shows a preferred embodiment of a control circuit for controlling a power supply circuit in accordance with the present invention (i.e. control circuit 500 controlling power supply circuit 1002). The control circuit 500 includes a pulse width modulation (PWM) controller 50 and a switched capacitor converter (SCC) 200. The PWM controller 50 is configured to control a transistor 20 by pulse width modulation according to a first control signal S1, so as to switch a transformer 10 of the power supply circuit to generate a first output voltage VO1 according to an input voltage Vin. The first output voltage VO1 is for example utilized to provide power to a household appliance (system device 60). More specifically, the first output voltage VO1 is for instance employed to drive a motor in a system device and/or control the power of a main device 62 such as a relay. The switched capacitor converter 200 is configured to convert the first output voltage VO1 to a second output voltage VO2 according to a second control signal S2. In one embodiment, the level of the first output voltage VO1 is higher than the level of the second output voltage VO. The output voltage controller 100 is configured to generate the first control signal S1 and the second control signal S2, for regulating the first output voltage VO1 and controlling the switched capacitor converter 200 respectively. In one embodiment, the control circuit 500 further includes a low dropout regulator which provides a regulated power source VCC to the communication circuit 61 in the system device 60 according to the second output voltage VO2. The communication circuit 61 generates a power saving signal SP via for example a general-purpose input/output (GPIO) interface, or via a universal asynchronous receiver/transmitter (UART) interface or an inter-integrated circuit (I²C) interface. The power saving signal SP is coupled to the output voltage controller 100 to save power. In one embodiment, when the power saving signal SP is enabled, the level of the first output voltage VO1 is reduced.

Capacitors 30 and 45 are output filters of the first output voltage VO1 and the regulated power source VCC, respectively.

Figure 3:
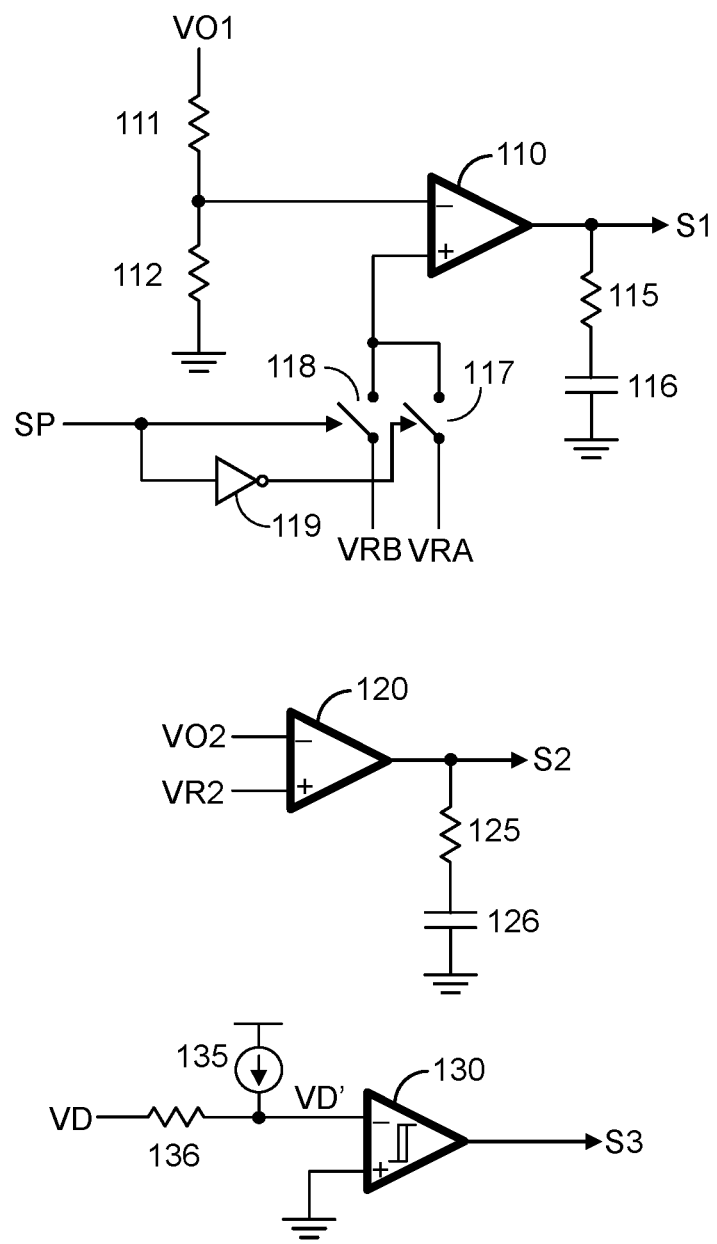
FIG. 3 illustrates a schematic circuit diagram of a control circuit for controlling a power supply circuit in accordance with another embodiment of the present invention.

Please refer to FIG. 3. FIG. 3 shows a preferred embodiment of the output voltage controller 100. A first error amplifier 110 is connected to the first output voltage VO1 via resistors 111 and 112, so as to generate the first control signal S1 according to the first output voltage VO1. Whether the first error amplifier 110 receives the reference voltage VRA or VRB can be selected via the power saving signal SP, whereby the level of the first output voltage VO1 can be determined by the power saving signal SP. A second error amplifier 120 receives the second output voltage VO2, so as to generate the second control signal S2. In one embodiment, a comparator 130 is configured to compare a reference signal (for instance a ground level) with an offset signal VD', so as to generate a third control signal S3 to control a transistor 25. The transistor 25 serves as a synchronous rectifier (SR) to generate the first output voltage VO1 with higher efficiency.

Please still refer to FIG. 3. A resistor 115 and a capacitor 116 form a compensation network of the first error amplifier 110. An inverter 119 and switches 117, 118 are configured to select the reference voltage VRA or VRB according to the power saving signal SP. A resistor 125 and a capacitor 126 form a compensation network of the second error amplifier 120. A current source 135 and a resistor 136 are configured to offset a drain voltage VD of the transistor 25 to generate an offset signal VD'.

Figure 4:
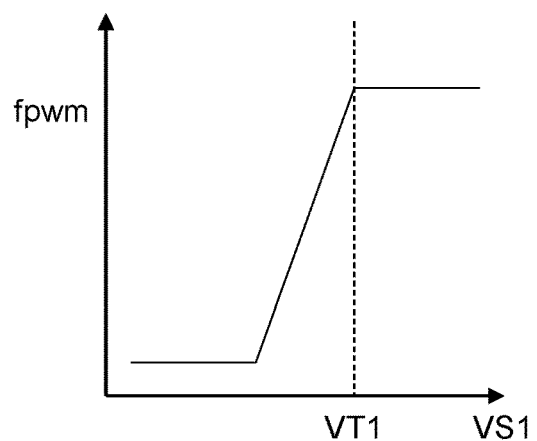
FIG. 4 illustrates a characteristic curve diagram of the switching frequency of a control circuit for controlling a power supply circuit in accordance with one embodiment of the present invention.

FIG. 4 illustrates diagram showing a relationship between the switching frequency fpwm of the PWM controller 50 and the level of the first control signal S1. When the voltage level VS1 of the first control signal S1 is lower than a threshold VT1, the switching frequency decreases as the voltage level VS1 decreases. As mentioned above, the first control signal S1 is a signal generated according to the first output voltage VO1. When the output load of the power supply circuit decreases, the level of the first control signal S1 correspondingly decreases. It needs to be explained that "the output load of the power supply circuit decreases" means that the power consumption or the current consumption of for example the system device 60 decreases.

Figure 5:
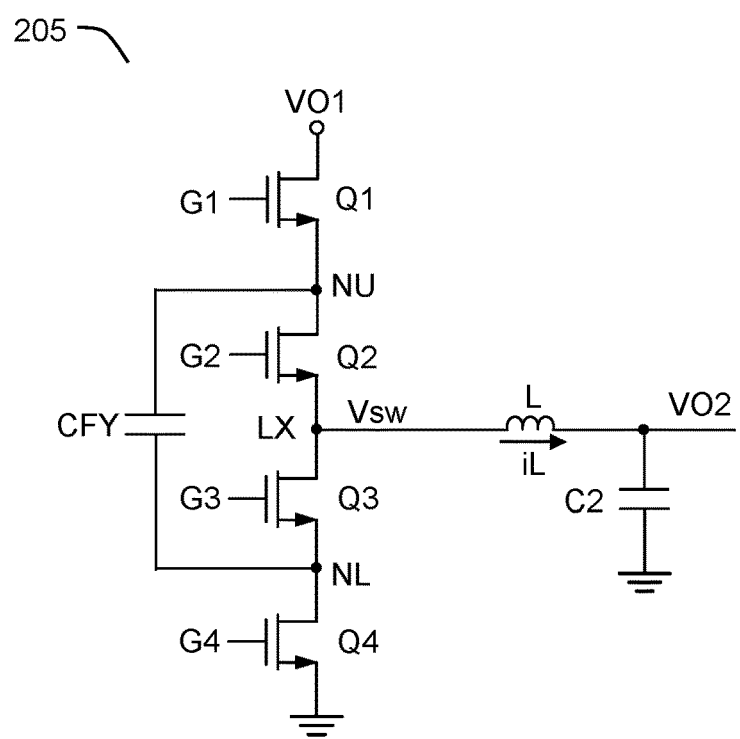
FIG. 5 illustrates a schematic circuit diagram of a switched capacitor converter in accordance with one embodiment of the present invention.
Figure 6A:
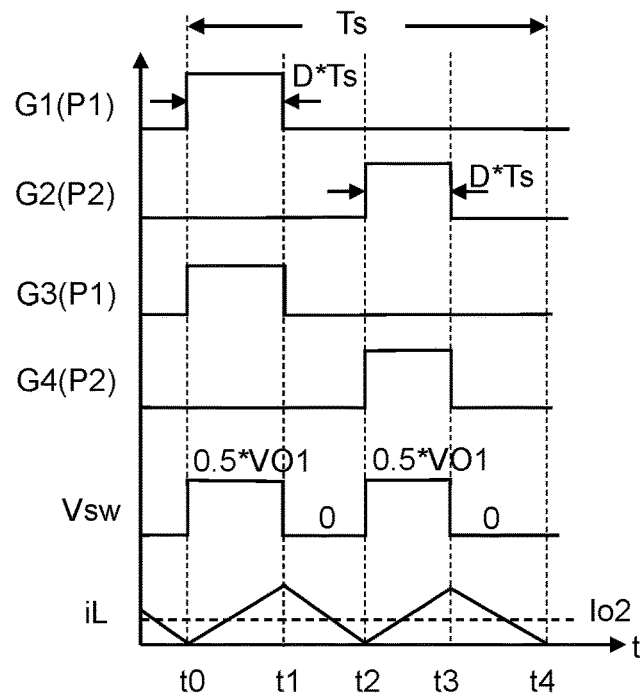
FIGS. 6A and 6B are operation waveform diagrams which correspond to embodiments of FIGS. 2 and 5.
Figure 6B:
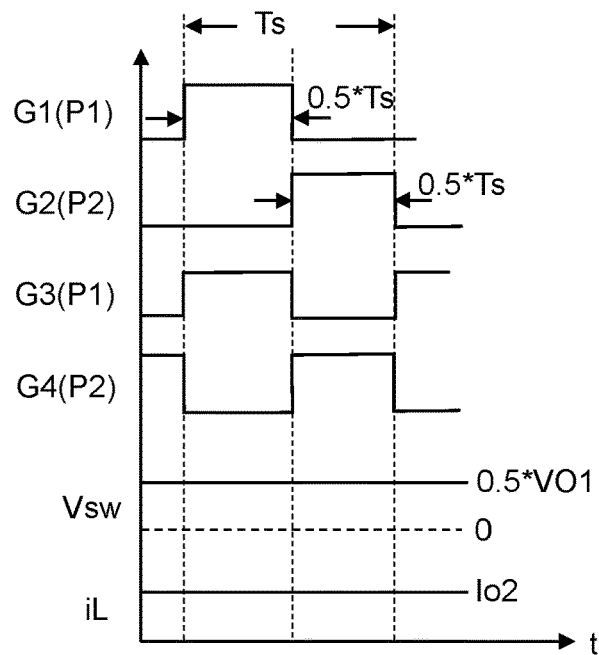

FIG. 5 shows a preferred embodiment of a switched capacitor converter in accordance with the present invention (i.e. switched capacitor converter 205). FIGS. 6A and 6B illustrate waveform diagrams of the switched capacitor converter 200 in accordance with the present invention. As shown in FIG. 5, in the present embodiment, the switched capacitor converter 205 includes a first high side switch Q1 and a second high side switch Q2 connected in series between the first output voltage VO1 and the switching node LX, wherein the first high side switch Q1 and the second high side switch Q2 are coupled with each other at a high side middle node NU in between. Plural low side switches include a first low side switch Q4 and a second low side switch Q3 connected in series between a ground level and the switching node LX, wherein the first low side switch Q4 and the second low side switch Q3 are coupled with each other at a low side middle node NL in between. In the present embodiment, an inductor L is coupled between the switching node LX and a second output voltage VO2 while a capacitor CFY is coupled between the high side middle node NU and the low side middle node NL. The first high side switch Q1, the second high side switch Q2, the first low side switch Q4 and the second low side switch Q3 are respectively controlled by corresponding control signals G1~G2 and G4~G3. A capacitor C2 is coupled to the second output voltage VO2.

From one perspective, the switched capacitor converter 205 is a buck converter which includes a flying capacitor (CFY). Referring to FIGS. 6A and 6B, in one embodiment, the switched capacitor converter 205 operates in a discontinuous conduction mode (DCM), with a maximum duty ratio which is preferably close to but lower than 50%. Note that the maximum duty ratio in fact can be 50%, but in order to avoid short-circuit through the switches, it is better to set a dead time between the ON periods of the high side and low side switches, so the maximum duty ratio thereof is close to but lower than 50%. In one embodiment, the capacitance of the capacitor CFY can be set to be equal to that of the capacitor C2.

Referring to FIG. 6A, in the present embodiment, when the power saving signal SP is disabled, the switched capacitor converter 205 operates in a buck switching mode. Specifically, during a first period (t0~t1) of a switching cycle Ts, the switches Q1 and Q3 are controlled by a switching signal P1 to be ON, whereby the first output voltage VO1 charges the capacitors CFY and C2 via the inductor L. The capacitors CFY and C2 are connected in series with each other. During a second period (t2~t3) of the switching cycle Ts, the switches Q2 and Q4 are controlled by a switching signal P2 to be ON, whereby the voltage of the capacitor CFY charges the capacitor C2 via the inductor L. The capacitors CFY and C2 are connected in parallel with each other via the inductor L.

The switching cycle Ts is the switching cycle of the switched capacitor converter 200. The duty ratio D is the duty ratio of the switching signals P1 and P2 of the switched capacitor converter 200 relative to the switching cycle Ts. Io2 represents an output current of the second output voltage VO2 FIG. 6A illustrates signal waveforms of the switched capacitor converter 205 in the buck switching mode, wherein the second control signal S2 regulates the second output voltage VO2 by controlling the duty ratio D of the switching signals P1 and P2. As shown in FIG. 6A, when the duty ratio D is less than 50%, during the intervals outside the ON period, for example the period t1~t2 or t3~t4, the switches Q1~Q4 are all turned off. Because the inductor current is still positive current, the voltage of the switching node Vsw is discharged to about 0V through the body diodes of the switches Q3 and Q4. From one perspective, by switching the switches in the buck switching mode, the switched capacitor converter 205 of the present embodiment switches one end of the inductor L between 0.5*VO1 and the ground level, and regulates the second output voltage VO2 to a predetermined level by adjusting the duty ratio D according to the feedback control.

In another embodiment, during the period t1~t2 or t3~t4 shown in FIG. 6A, optionally, the switches Q3 and Q4 can be turned ON, to reduce the conduction resistance so as to enhance the power conversion efficiency.

FIG. 6B illustrates signal waveforms of the switched capacitor converter 205 when the power saving signal SP is enabled. In one embodiment, when the power saving signal SP is enabled, the switched capacitor converter 205 operates in a capacitor switching mode; more specifically, in this mode, the duty ratio D of the switching signals P1 and P2 of the switched capacitor converter 205 will increase, relative to FIG. 6A. In one preferred embodiment, the duty ratio D of the switching signals P1 and P2 will increase to approximately 50%, but still with a dead time in between to avoid turning ON the switches at the same time to cause short-circuit, so the duty ratio D will be slightly lower than 50% (this is referred to as "substantially equals to 50%"). Furthermore, when the first output voltage VO1 is reduced, the duty ratio D of the switching signals P1 and P2 of the switched capacitor converter 205 also will increase. When the power saving signal SP is enabled, the level of the first output voltage VO1 will be set as twice the level of the second output voltage VO2 (the second output voltage VO2 is for example 3.3V, so the first output voltage VO1 will be set as for example 6.6V); as shown in FIG. 6B, this will significantly decrease the ripple current of the switching current iL (i.e. the inductor current) of the inductor L. Thus, the switching loss of the switched capacitor converter 205 is reduced.

Moreover, in one embodiment, when the power saving signal SP is enabled, the switching cycle Ts of the switched capacitor converter 205 will increase, i.e., the switching frequency of the switched capacitor converter 205 will decrease, to reduce the switching loss.

Figure 7:
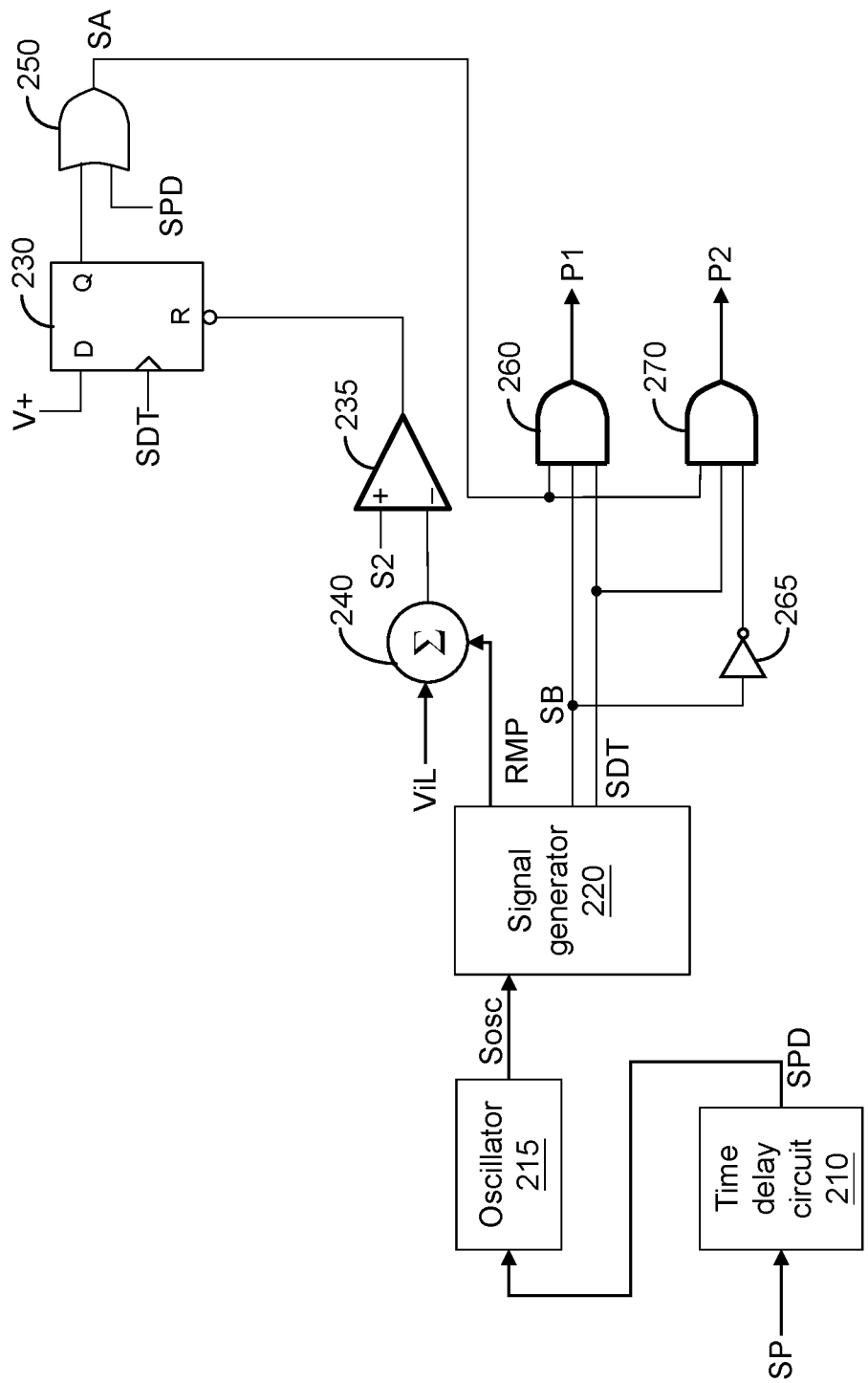
FIG. 7 illustrates a schematic circuit diagram of a controller for controlling a switched capacitor converter in accordance with one embodiment of the present invention.

FIG. 7 is a preferred embodiment of a controller for controlling the switched capacitor converter (e.g. 205 of FIG. 5) in accordance with the present invention. In the present embodiment, an oscillator 215 generates an oscillation signal Sosc which determines the switching frequency fpwm of the switched capacitor converter 205. A time delay circuit 210 provides a time delay interval for the power saving signal SP and generates a delayed power saving signal SPD. The frequency of the oscillation signal Sosc is reduced when the delayed power saving signal SPD is enabled. The oscillation signal Sosc is coupled to a signal generator 220 to generate a ramp signal RMP, a dead time signal SDT and a frequency division signal SB. Specifically, the frequency of the frequency division signal SB is one half that of the oscillation signal Sosc.

Figure 8:
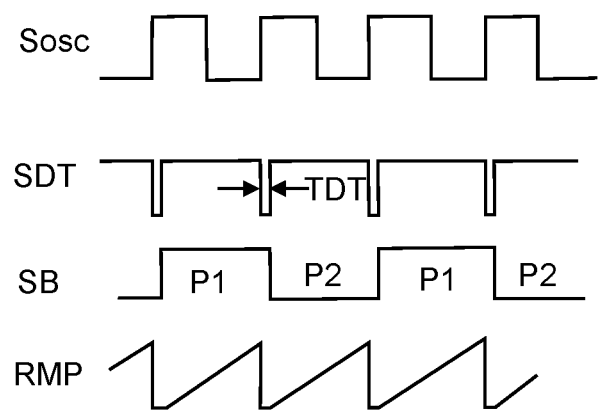
FIG. 8 illustrates an operation waveform diagram of a signal generator in accordance with one embodiment of the present invention.

Please refer to FIG. 8. FIG. 8 illustrates signal waveforms of the signal generator 220. The rising edge of the oscillation signal Sosc generates the dead time signal SDT. In the present embodiment, the dead time signal SDT is a negative pulse. The rising edge of the dead time signal SDT changes the state of the frequency division signal SB. The dead time signal SDT is further utilized to generate the ramp signal RMP. The rising edge of the dead time signal SDT triggers a flip-flop 230 to enter a set state. A sum of an inductor current signal ViL and the ramp signal RMP is coupled to an input terminal of a comparator 235 to be compared with the second control signal S2, so as to generate a reset signal at an output terminal of the comparator 235 to be provided to the flip-flop 230. The output terminal of the comparator 235 is connected with the flip-flop 230 to reset the flip-flop 230. An OR gate 250 generates a duty ratio adjusting signal SA according to the output of the flip-flop 230 and the delayed power saving signal SPD. When the switched capacitor converter 205 operates in the buck switching mode (i.e. when the power saving signal SP is disabled), the duty ratio adjusting signal SA adjusts the duty ratio D of the switching signals P1 and P2 according to the second control signal S2. When the power saving signal SP is enabled, the duty ratio adjusting signal SA will be set to high level. The second error amplifier 120 and the second control signal S2 are thus open-loop in the feedback control of the second output voltage VO2. The duty ratio adjusting signal SA, the frequency division signal SB and the dead time signal SDT are connected to an AND gate 260 to generate the switching signal P1. The frequency division signal SB is further coupled to an AND gate 270 via an inverter 265 while the frequency division signal SB and the dead time signal SDT are also connected with the AND gate 270 to generate the switching signal P2. Thus, when the power saving signal SP is enabled, the duty ratio of the switching signals P1 and P2 is determined according to the frequency division signal SB, i.e. 50%. The dead time signal SDT provides a dead time TDT between the switching signals P1 and P2.

Figure 9:
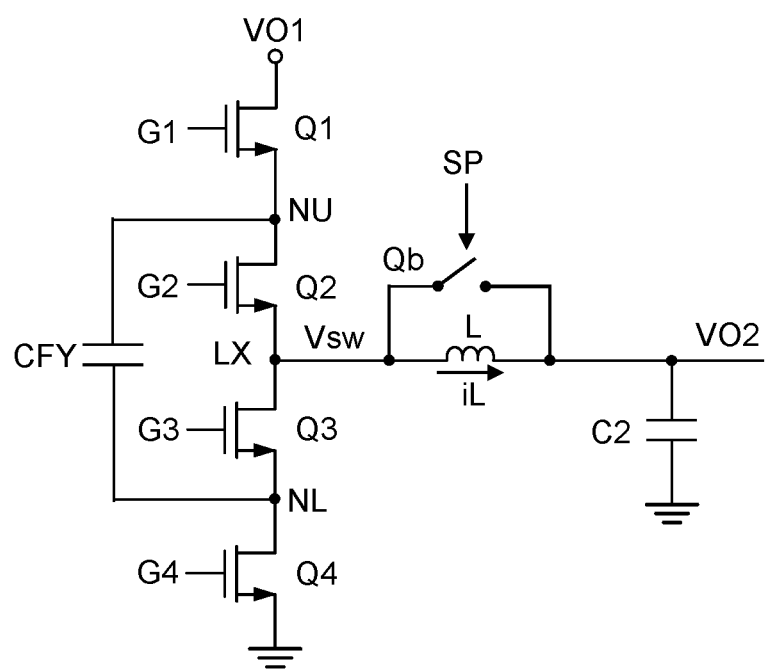
FIG. 9 illustrates a schematic circuit diagram of a switched capacitor converter in accordance with one embodiment of the present invention.

FIG. 9 illustrates a schematic circuit diagram of a switched capacitor converter in accordance with one embodiment of the present invention. The switched capacitor converter 209 of the present embodiment is similar to the switched capacitor converter 205 of the embodiment of FIG. 5, and the difference therebetween is that the switched capacitor converter 209 further includes a bypass switch Qb. When the power saving signal SP is enabled, the bypass switch Qb is controlled to be ON, so as to avoid, for instance, the ringing caused by transient load variations.

Figure 10:
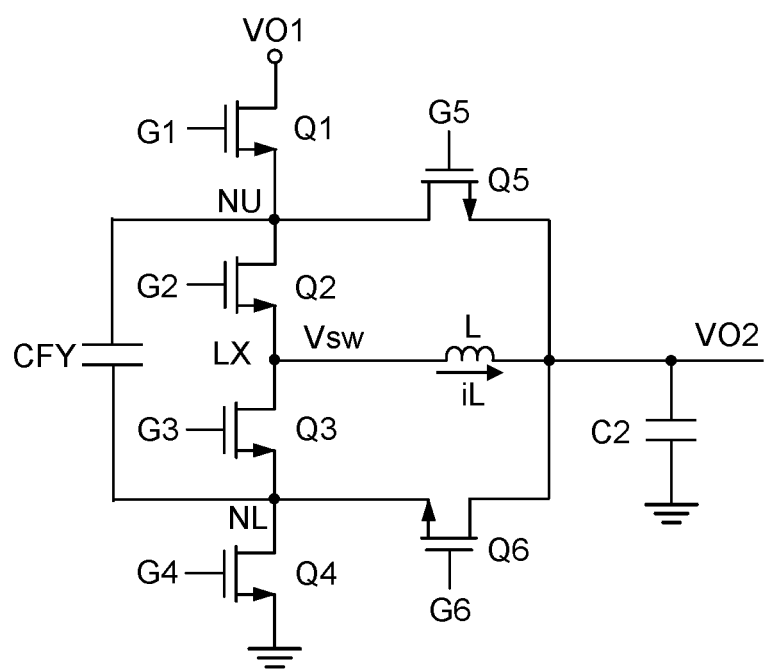
FIG. 10 illustrates a schematic circuit diagram of a switched capacitor converter in accordance with one embodiment of the present invention.

FIG. 10 illustrates a schematic circuit diagram of a switched capacitor converter in accordance with one embodiment of the present invention (i.e. switched capacitor converter 2010). The switched capacitor converter 2010 is similar to the switched capacitor converter 205 of the embodiment of FIG. 5, and the difference therebetween is that the switched capacitor converter 2010 further includes a high side auxiliary switch Q5 and a low side auxiliary switch Q6. In the present embodiment, the high side auxiliary switch Q5 is coupled between the second output voltage VO2 and the high side middle node NU while the low side auxiliary switch Q6 is coupled between the second output voltage VO2 and the low side middle node NL. The capacitor CF is coupled between the high side middle node NU and the low side middle node NL. The high side auxiliary switch Q5 and the low side auxiliary switch Q6 are respectively controlled by the corresponding control signals G5 and G6.

In one embodiment, the control signal G5 is an AND operation result of the power saving signal SP and the switching signal P2 while the control signal G6 is an AND operation result of the power saving signal SP and the switching signal P1. In another aspect, the control signal G2 is an AND operation result of an inverted signal of the power saving signal SP and the switching signal P2 while the control signal G3 is an AND operation result of an inverted signal of the power saving signal SP and the switching signal P1. Referring to FIGS. 6A and 6B, in the present embodiment, when the power saving signal SP is enabled, the second high side switch Q2 and the second low side switch Q3 are turned off while the high side auxiliary switch Q5 is switched according to the switching signal P2 and the low side auxiliary switch Q6 is switched according to the switching signal P1, as shown in FIG. 6B. In another aspect, when the power saving signal SP is disabled, the high side auxiliary switch Q5 and the low side auxiliary switch Q6 are turned off while the second high side switch Q2 is switched according to the switching signal P2 and the second low side switch Q3 is switched according to the switching signal P1, as shown in FIG. 6A. Therefore, besides avoiding the ringing caused by transient load variations, the power conversion efficiency at heavy load can be enhanced.

In one embodiment, when the switched capacitor converters 205, 209 and 2010 operate in the buck switching mode (the power saving signal SP is disabled), optionally three-level PWM conversion may be performed. Specifically, in the present embodiment, the switched capacitor converter is switched repeatedly according to a switching cycle. During a first time period of the switching cycle, the first high side switch Q1 and the second low side switch Q3 are turned on while the second high side switch Q2 and the first low side switch Q4 are turned off. During a second time period of the switching cycle, the first low side switch Q4 and the second low side switch Q3 are turned on while the first high side switch Q1 and the second high side switch Q2 are turned off. During a third time period of the switching cycle, the second high side switch Q2 and the first low side switch Q4 are turned on while the first high side switch Q1 and the second low side switch Q3 are turned off. During a fourth time period of the switching cycle, the first high side switch Q1 and the second high side switch Q2 are turned on while the first low side switch Q4 and the second low side switch Q3 are turned off. As such, the voltage of the switching node LX is periodically switched among three different voltage levels: the first output voltage VO1, the ground level and 0.5*VO1, to achieve three-level PWM power conversion.

On the other hand, in the present embodiment, when the power saving signal SP is enabled, the second high side switch Q2 and the second low side switch Q6 are turned off while the first high side switch Q1 and the low side auxiliary switch Q6 are switched according to the switching signal P1 shown in FIG. 6B, and the first low side switch Q4 and the high side auxiliary switch Q5 are switched according to the switching signal P2 shown in FIG. 6B, so as to perform capacitive power conversion.

From one perspective, in the embodiments of FIGS. 9 and 10, when the power saving signal SP is enabled, the switched capacitor converters 209 and 2010 perform capacitive power conversion only with the capacitors CFY and C2, by charging and discharging these capacitors.

Figure 11:
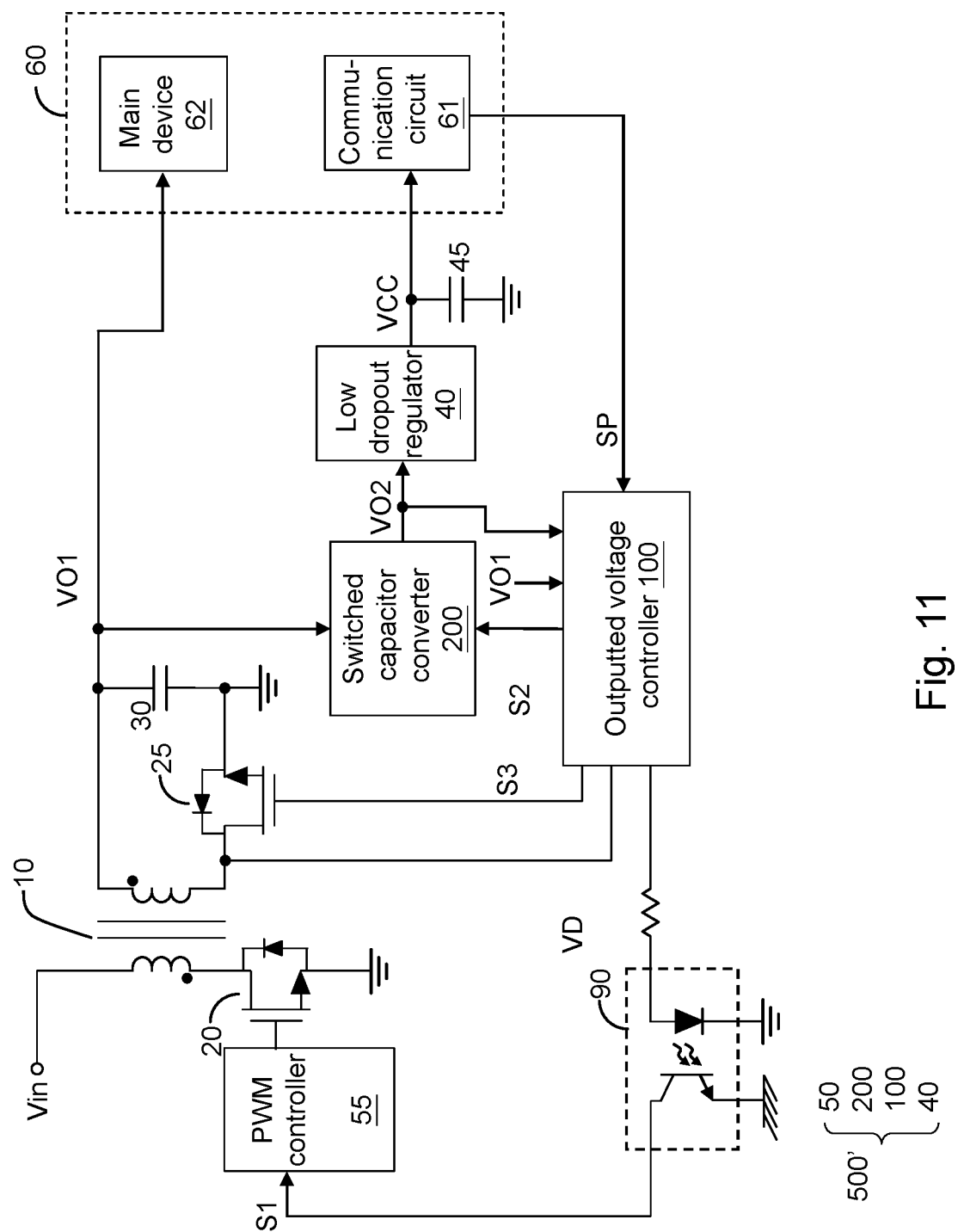
FIG. 11 illustrates a schematic circuit diagram of a control circuit for controlling a power supply circuit in accordance with one embodiment of the present invention.

FIG. 11 shows another preferred embodiment of a control circuit for controlling a power supply circuit in accordance with the present invention. The present embodiment is similar to the embodiment of FIG. 2. In the control circuit 500' of the present embodiment, the first control signal S1 is coupled to a PWM controller 55 through an optocoupler 90. A primary side circuit and a secondary side circuit of the power supply circuit are isolated.

The present invention provides a control circuit for controlling a power supply circuit as described above, which can control the switched capacitor converter to operate in the buck switching mode (i.e., when the power saving signal SP is disabled) or the capacitor switching mode (i.e., when the power saving signal SP is enabled) by controlling the duty ratio of the switches in the switched capacitor converter. In the buck switching mode, the switched capacitor converter can control the inductor current according to the duty ratio, so as to adjust the second output voltage VO2. On the other hand, when the power saving signal SP is enabled, the switched capacitor converter can operate in the capacitor switching mode, such that the ripple current of the inductor L can be reduced and the power conversion efficiency can be enhanced.

The present invention has been described in considerable detail with reference to certain preferred embodiments thereof. It should be understood that the description is for illustrative purpose, not for limiting the broadest scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. In view of the foregoing, the spirit of the present invention should cover all such and other modifications and variations, which should be interpreted to fall within the scope of the following claims and their equivalents.

What is claimed is:

1. A control circuit for controlling a power supply circuit to provide power to a system device which includes a communication circuit, the control circuit comprising:
a pulse width modulation (PWM) controller configured to operably switch a transformer of the power supply circuit to generate a first output voltage; and
a switched capacitor converter configured to operably generate a second output voltage according to the first output voltage;
wherein the second output voltage is configured to operably provide power to the communication circuit, wherein the communication circuit generates a power saving signal to control the PWM controller and the switched capacitor converter, wherein when the power saving signal is enabled, the first output voltage is reduced and a duty ratio of the switched capacitor converter is increased.

2. The control circuit of claim 1, further comprising an output voltage controller configured to operably generate a first control signal and a second control signal, wherein the first control signal is configured to operably regulate the first output voltage and the second control signal is configured to operably control the second output voltage.

3. The control circuit of claim 1, wherein the switched capacitor converter is a buck converter having a duty ratio which is less than 50%.

4. The control circuit of claim 1, wherein when the power saving signal is enabled, a switching frequency of the switched capacitor converter is reduced.

5. The control circuit of claim 1, wherein a level of the first output voltage is higher than a level of the second output voltage.

6. The control circuit of claim 1, wherein when the power saving signal is enabled, a level of the first output voltage is twice a level of the second output voltage.

7. The control circuit of claim 1, wherein when an output load of the power supply circuit is decreased, a switching frequency of the PWM controller is decreased.

8. The control circuit of claim 1, wherein the switched capacitor converter operates in a discontinuous conduction mode.

9. The control circuit of claim 1, further comprising a synchronous rectifier configured to operably generate the first output voltage.

10. The control circuit of claim 1, wherein when the power saving signal is enabled, the duty ratio of the switched capacitor converter is close to 50%.

11. The control circuit of claim 1, further comprising a low dropout regulator configured to operably generate a regulated power source according to the second output voltage, to provide power to the communication circuit.

12. The control circuit of claim 2, wherein the output voltage controller includes a first error amplifier and a second error amplifier, wherein the first error amplifier is coupled to the first output voltage to generate the first control signal, and wherein the second error amplifier is coupled to the second output voltage to generate the second control signal.

13. The control circuit of claim 12, wherein when the power saving signal is enabled, the second error amplifier is open-loop.

14. The control circuit of claim 2, wherein the first control signal is coupled to the PWM controller via an optocoupler.

15. The control circuit of claim 3, wherein the switched capacitor converter includes:
an inductor, a plurality of capacitors and a plurality of switches coupled with one another;
wherein when the power saving signal is disabled, the plurality of switches are configured to operably switch the inductor and the plurality of capacitors, such that the switched capacitor converter operates in a buck switching mode;
wherein when the power saving signal is enabled, the plurality of switches are configured to operably switch the inductor and the plurality of capacitors, such that the switched capacitor converter operates in a capacitive power conversion mode.

16. The control circuit of claim 15, wherein the plurality of capacitors include a first capacitor and a second capacitor, wherein the plurality of switches include a first high side switch, a second high side switch, a first low side switch and a second low side switch; wherein the first high side switch and the second high side switch are connected in series between the first output voltage and a switching node, and the first high side switch and the second high side switch are coupled with each other at a high side middle node; wherein the first low side switch and the second low side switch are connected in series between a ground level and the switching node, and the first low side switch and the second low side switch are coupled with each other at a low side middle node; wherein the inductor is coupled between the switching node and the second output voltage; wherein the first capacitor is coupled between the high side middle node and the low side middle node; wherein the second capacitor is coupled to the second output voltage.

17. The control circuit of claim 16, wherein the first high side switch and the second low side switch are switched according to a first switching signal based on a switching cycle and a duty ratio, wherein the second high side switch and the first low side switch are switched according to a second switching signal based on the switching cycle and the duty ratio;
wherein when the power saving signal is disabled, the duty ratio is less than 50%;
wherein when the power saving signal is enabled, the duty ratio substantially equals to 50%.

18. The control circuit of claim 16, wherein the plural switches further include a bypass switch connected in parallel with the inductor, wherein when the power saving signal is disabled, the bypass switch is turned off, and wherein when the power saving signal is enabled, the bypass switch is turned on.

19. The control circuit of claim 16, wherein the plurality of switches further include a high side auxiliary switch and a low side auxiliary switch, wherein the high side auxiliary switch is coupled between the second output voltage and the high side middle node, wherein the low side auxiliary switch is coupled between the second output voltage and the low side middle node;
wherein when the power saving signal is disabled, the high side auxiliary switch and the low side auxiliary switch are turned off;
wherein when the power saving signal is enabled, the second high side switch and the second low side switch are turned off.

20. The control circuit of claim 19, wherein when the power saving signal is disabled, the first high side switch and the second low side switch are switched according to a first switching signal based on a switching cycle and a duty ratio, and the second high side switch and the first low side switch are switched according to a second switching signal based on the switching cycle and the duty ratio, wherein the duty ratio is less than 50%;
wherein when the power saving signal is enabled, the first high side switch and the low side auxiliary switch are switched according to the first switching signal based on the switching cycle and the duty ratio, and the high side auxiliary switch and the first low side switch are switched according to the second switching signal based on the switching cycle and the duty ratio, wherein the duty ratio substantially equals to 50%.

21. The control circuit of claim 19, wherein when the power saving signal is disabled, the inductor and the plurality of capacitors are switched by the first high side switch, the second high side switch, the first low side switch and the second low side switch based on a switching cycle to perform three-level PWM power conversion;
wherein when the power saving signal is enabled, the inductor and the plurality of capacitors are switched by the first high side switch, the high side auxiliary switch, the first low side switch and the low side auxiliary switch based on the switching cycle to perform capacitive power conversion.

* * * * *